United States Patent [19]

Lagoni

[11] Patent Number: 5,272,522
[45] Date of Patent: Dec. 21, 1993

[54] VIDEO SIGNAL PROCESSING CIRCUITS

[75] Inventor: William A. Lagoni, Indianapolis, Ind.

[73] Assignee: Thomson Consumer Electronics, Inc., Indianapolis, Ind.

[21] Appl. No.: 513,477

[22] Filed: Apr. 30, 1990

[51] Int. Cl.$^5$ .................................................. H04N 9/72
[52] U.S. Cl. ......................................... 358/30; 358/34
[58] Field of Search ................ 358/30, 31, 34, 39, 358/36

[56] References Cited

U.S. PATENT DOCUMENTS

| | | | |
|---|---|---|---|
| 4,183,050 | 1/1980 | Tsuchiya et al. | 358/30 |
| 4,458,263 | 7/1984 | Schutte | 358/30 |
| 5,010,395 | 4/1991 | Tsuji et al. | 358/34 |

FOREIGN PATENT DOCUMENTS

| | | |
|---|---|---|
| 0339718 | 11/1989 | European Pat. Off. . |
| 2223908 | 12/1973 | Fed. Rep. of Germany . |
| 2625775 | 12/1977 | Fed. Rep. of Germany . |
| 0248783 | 10/1989 | Japan . |
| 1225862 | 3/1971 | United Kingdom ................ 358/39 |

OTHER PUBLICATIONS

Fernseh-Empfangstechnik. Peter Zastrow, copyright 1983 by Frankfurter Fachverlag Michael Kohl GmbH & Co. KG, Frankfurt am Main, Germany (translation).

Primary Examiner—James J. Groody
Assistant Examiner—David E. Harvey
Attorney, Agent, or Firm—Joseph S. Tripoli; Peter M. Emanuel

[57] ABSTRACT

Video signal processing circuit including a source of composite luminance signals having image-representative components separated by regularly recurring synchronizing signal components; keyed clamp and signal clipping circuit coupled to the luminance signal source and responsive to back porch keying pulses for clamping a back porch interval of the composite luminance signal to a predetermined direct voltage level, the keyed clamp and signal clipping circuit further including a voltage sensitive signal clipping circuit responsive to the direct voltage level and to the clamped composite luminance signals for removing synchronizing signal components from the composite components; chrominance signal processing circuit for demodulating a color subcarrier signal to produce a plurality of color difference signals; a source of keying pulses recurring during the synchronizing signal interval; and a plurality of keyed clamp circuits each responsive to the synchronizing signal interval keying pulses and individually responsive separately to one of the demodulated color difference signals and the image-representative luminance signal for clamping each of the color difference and image-representative luminance signals to a common voltage reference level.

10 Claims, 4 Drawing Sheets

VIDEO SIGNAL PROCESSING CIRCUITS

BACKGROUND OF THE INVENTION

A standard television video signal is made up of relatively short duration, fixed amplitude, negative-going, line (horizontal) synchronizing pulses, between which a varying amplitude, image brightness-representative (luminance) video signal occurs in association with a particular image scanning line. The horizontal sync pulses occupy a blanking interval which includes, in addition to the sync pulse, a "back porch" or relatively fixed amplitude portion, the amplitude of which is defined as the reference black level of the image. The sync pulses extend into the blacker-than-black amplitude region of the video signal.

In the case of color television signals, a color synchronizing burst or short duration, continuous wave sample of a color subcarrier (e.g. 3.58 MHZ) is superimposed on the back porch of the composite video waveform. Color difference signals, which are produced as modulation components of the suppressed subcarrier waveform, also are spaced between the periodic burst signals during the line scanning intervals.

In the processing of the television composite video signals, numerous circumstances arise in which it is necessary to fix the reference black level of the demodulated luminance signal at a particular d-c voltage level that is appropriate for a particular part of the signal processing system. Furthermore, it is frequently necessary to d-c restore the demodulated color difference signals to a proper d-c level before they are recombined with luminance information to produce desired red (R), green (G) and blue (B) drive signals for application to an associated display device.

A particular problem arises in cases where significant segments of signal processing are to be accomplished making use of existing integrated circuit chips. In that case, since signals are modified within the confines of a chip and only a limited number of access points are provided to bring certain signals out of and into any single chip, manipulation of signals in a unique manner outside of the chips may be required. Furthermore, where signals are processed outside a chip or are coupled from chip to chip, a-c coupling is usually required, thereafter necessitating d-c restoring before ultimate application to an image reproducing device.

For example, certain single chip TV processors (e.g. Toshiba Type TA8680) do not include provisions to blank or remove the color burst signal from the modulated color difference signals prior to detection. As a result, when the color difference signals are demodulated within the processor chip, a d-c "burst offset" is produced above the reference level of the demodulated color difference signals during the back porch interval. The presence of this burst offset vitiates against d-c restoration of the color difference signals during the preferred back porch interval since that level is contaminated by the presence of the burst offset. In that case, d-c restoration of the color difference signals during the immediately adjacent sync pulse interval would be called for. However, the accompanying luminance signals include blacker-than-black sync tips during the sync interval, and the presence of these sync tips would produce an imbalance between the luminance and chrominance d-c levels if a sync interval clamp were employed in connection with both the luminance and the demodulated color difference signals. In order to permit d-c restoration of both the demodulated luminance and chrominance signals during the same time interval (i.e. by means of a single gating pulse applied to a single chip terminal), additional special processing of the luminance signal or the color difference signal is required.

Circuits and systems are known for processing combined luminance and sync signals so as to separate the two and thereby produce luminance signals from which sync has been stripped (see, for example, U.S. Pat. No. 4,628,361, "Video Synchronizing Signal Separator" granted Dec. 9, 1986 to Sam Andreas). Such circuits include, in general, a unidirectionally conducting device which is biased to reject the sync tips and to pass luminance information.

Additional circuits are known for clamping the reference black level occurring during the back porch interval to a desired d-c level (see, for example, U.S. Pat. No. 4,424,528, "Video Circuit", granted Jan. 3, 1984 to J.A. Karlock et al.) and thereafter separating the sync pulses from the clamped luminance.

It is also known to separate sync pulses from video by clamping the sync tips to a reference voltage such as ground and thereafter clipping all amplitude components above a predetermined level to leave only the sync pulses for further processing (see, for example, U.S. Pat. No. 4,081,833, "Synchronizing Signal Separating Circuit For Video Signal Processing", granted Mar. 28, 1978 to H. Akiyama; U.S. Pat. No. 4,296,437, "Clamping Circuit for a Video Signal", granted Oct. 20, 1981 to M.F.A.M. Geurts; U.S. Pat. No. 4,489,349, "Video Brightness Control Circuit", granted Dec. 18, 1984 to T. Okada).

Despite the foregoing developments, there remains a need for a simple, accurate and reliable combined video clamp and sync separator circuit for providing an accurately referenced video signal free of sync which may thereafter be a-c coupled to a subsequent processing circuit including a sync interval d-c restorer.

Furthermore, a single circuit for providing the foregoing video signal free of sync and a separate output of sync free of video without the need for adjustment of circuit parameters or voltage levels is particularly desireable.

SUMMARY OF INVENTION

In accordance with one aspect of the present invention, in a television signal processing system including apparatus for separating synchronizing signal components from image-representative components of a composite luminance signal, video signal processing apparatus comprises a source of composite luminance signals including image-representative components separated by regularly recurring synchronizing signal components; keyed clamp and signal clipping means coupled to the luminance signal source and responsive to back porch keying pulses for clamping a back porch interval of the composite luminance signal to a predetermined direct voltage level, the keyed clamp and signal clipping means further comprising a voltage sensitive signal clipping circuit responsive to the direct voltage level and to the clamped composite luminance signals for removing synchronizing signal components from the composite components; chrominance signal processing means for demodulating a color subcarrier signal to produce a plurality of color difference signals; a source of keying pulses recurring during the synchronizing signal interval; and a plurality of keyed clamp means each responsive to the synchronizing signal interval keying pulses and individually responsive separately to one of the demodulated color difference signals and the image-representative luminance signal for clamping each of the color difference and image-representative luminance signals to a common voltage reference level.

DETAILED DESCRIPTION

Figure 1:
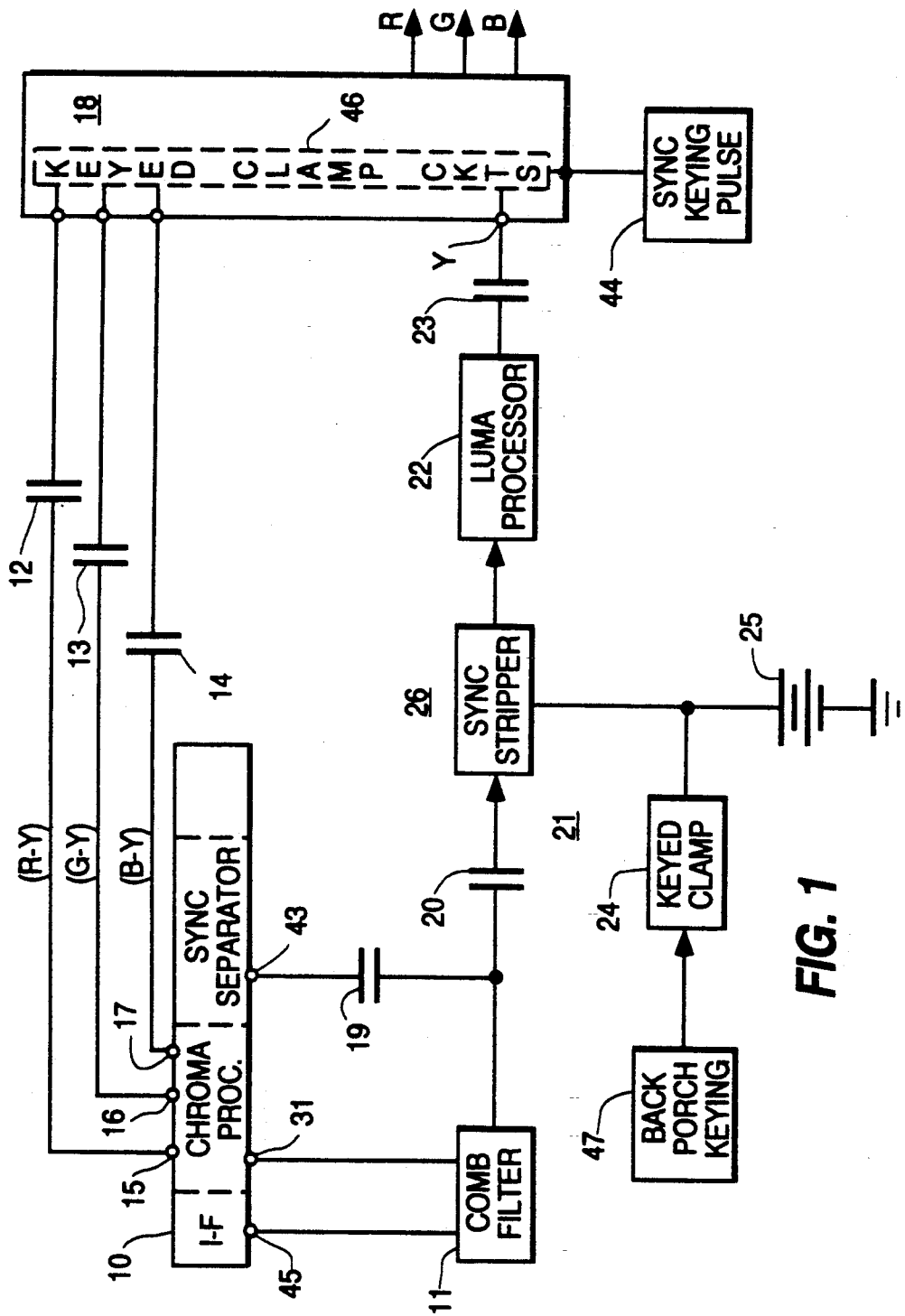
FIG. 1 is a block diagram of a portion of the signal processing circuits of a color television image display system incorporating the present invention.

In FIG. 1, a portion of a color television image display system is shown such as a color television receiver employing relatively complex but standard, commercially available signal processing integrated circuits or chips in combination with particular "off-chip" custom circuits or devices. Specifically, in the illustrated portion of a receiver, a so-called "one chip" (or single chip) NTSC color TV signal processor 10 such as the Type TA8680N available from Toshiba Corporation is shown. The single chip processor 10 includes picture I-F (intermediate frequency) amplifier circuits, sound I-F amplifier circuits, appropriate detectors for each of the picture and sound signals, as well as appropriate frequency and gain control circuitry, video (luminance) signal processing circuits, chroma (color) signal processing circuits, and a synchronizing (sync) signal separator section.

Figure 3A:
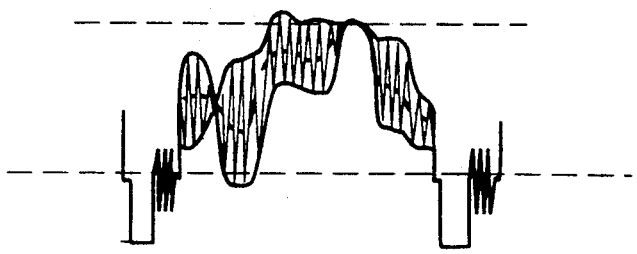
FIGS. 3A–3F are a series of waveform diagrams illustrating typical operation of the circuit of FIG. 2 in the system shown in FIG. 1.
Figure 3B:
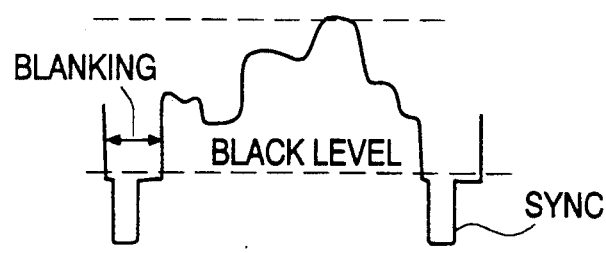
Figure 3C:
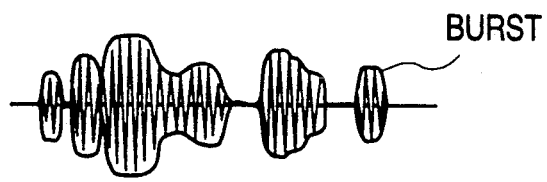
Figure 3D:
Figure 3E:

In a typical application of the single chip processor 10, a detected composite chrominance and luminance (composite video) signal (see FIG. 3 waveform A) is coupled via a terminal 45 to a comb filter 11 arranged to separate the detected luminance and interleaved chrominance signal components from each other. The composite chrominance (color difference) signal components (see FIG. 3, waveform C) are coupled back into single chip processor 10 via a terminal 31 for further processing to derive separate color difference signal components (R-Y, G-Y, B-Y) at respective output terminals 15, 16 and 17. The color difference signal outputs from terminals 15, 16, 17 (see FIG. 3D for typical waveform) are coupled via individual capacitors 12, 13, 14, to corresponding input terminals (not numbered) of a signal combining or matrix chip 18 which may, for example, be a commercial type TA7730, also available from Toshiba Corporation.

The comb filter 11 also produces a separated baseband luminance signal, including image-representative portions and regularly recurring synchronizing (sync) signal components (see FIG. 3, waveform B). The combed luminance signal is coupled back into single chip processor 10 via a capacitor 19 and a terminal 43 for further processing of the luminance signal components and/or separation of sync from video, as may be desired in a particular application of the single chip processor 10.

The combed luminance signal output (waveform 3B) from comb filter 11 is coupled via a capacitor 20 to an external or "off-chip" luminance sync separator circuit indicated generally by the reference character 21. Luminance-sync separator circuit 21, as will be explained more fully below, is arranged to remove synchronizing signal components from the luminance signal to permit subsequent processing of the luminance signal in a luminance processor 22, the output of which is coupled via a capacitor 23 to a luminance (Y) signal input terminal of matrix chip 18. A first keying pulse identified as a "sync keying pulse" (see FIG. 3, waveform E) is also coupled to matrix chip 18 from a sync keying pulse source 44 to provide d-c restoration of the color difference signals (R-Y, G-Y, B-Y) and the luminance signal (Y) by means of keyed clamp circuits 46 within matrix chip 18 prior to their being combined to produce desired color output signals (R,G,B,Y) for application to a color image reproducing device such as a color picture tube or kinescope (not shown).

The luminance-sync separator 21 comprises the combination of a keyed clamp circuit 24 which operates in response to a second keying pulse supplied by a source 47 of a "back porch keying pulse" (see FIG. 3, waveform F) to clamp the luminance signal (waveform 3B) to a reference voltage, shown schematically as a fixed source of voltage or battery 25. The keyed clamp 24 operates in conjunction with coupling capacitor 20 to clamp the back porch interval of the luminance signal to the desired reference voltage as will be explained below. In addition, the fixed source of voltage 25 is coupled to a sync stripper circuit 26 coupled between capacitor 20 and luminance signal processor 22 so as to separate the luminance and sync signal components to permit processing of luminance (Y) free of sync components.

Figure 2:
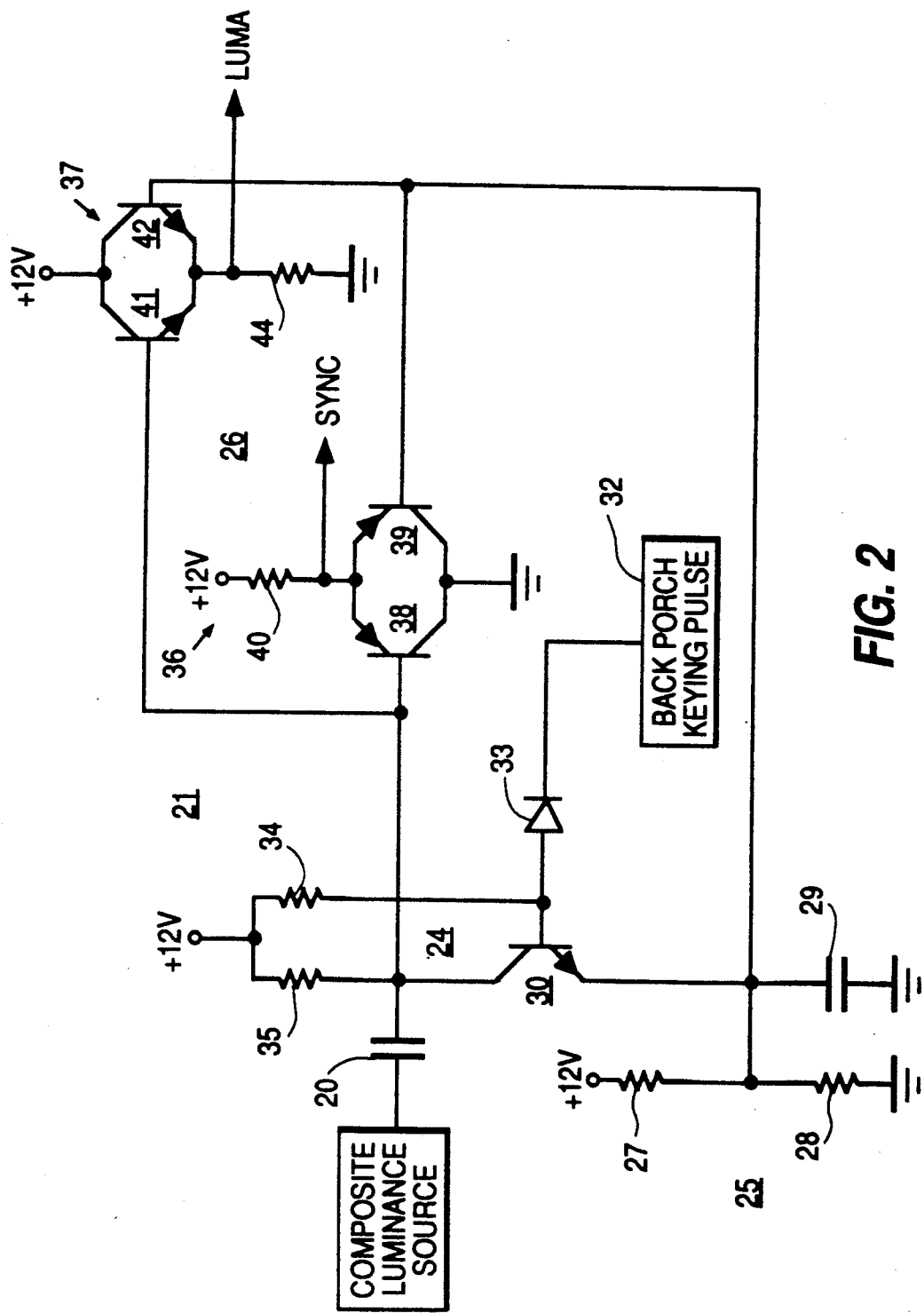
FIG. 2 is a schematic circuit diagram of a keyed clamp and associated signal clipper circuits constructed in accordance with one aspect of the present invention.

Referring now to FIG. 2, a specific circuit arrangement suitable for the luminance-sync separator circuit 21 is illustrated. The same reference numerals are used in FIGS. 1 and 2 to designate corresponding components. The circuit 21 is the subject matter of concurrently filed U.S. application Ser. No. 513,475, abandoned in favor of continuation application Ser. No. 863,343, which issued as U.S. Pat. No. 5,162,909, which is assigned to the same assignee as the present application.

The fixed source of voltage 25 is illustrated in FIG. 2 as comprising a resistor voltage divider including resistors 27 and 28 coupled across a source of positive operating voltage (such as +12 volts). The junction point between resistors 27 and 28 is maintained at a substantially constant reference level by means of a filter capacitor 29 which is returned to ground potential. An NPN keyed clamp transistor 30 is provided and includes an emitter electrode connected to the reference voltage across capacitor 29, a collector electrode coupled to a source of operating voltage (+12V) via a charging resistor 35 and a base electrode which is coupled to a source of keying pulses 32 via a blocking diode 33 and is also coupled to a base drive resistor 34. The collector of clamp transistor 30 also is connected to one terminal of composite luminance signal coupling capacitor 20 to provide the desired clamping of the luminance signal coupled via capacitor 20 as will be explained below. The junction of capacitor 20 and the collector electrode of clamp transistor 30 is also direct coupled to a relatively positive signal clipper circuit 36 and to a relatively negative signal clipper circuit 37.

Positive signal clipper circuit 36 comprises first and second transistors 38, 39 of a first conductivity (PNP) type having their collector electrodes returned to reference (ground) potential and having their emitter electrodes connected together and returned via an emitter load resistor 40 to a source of operating voltage (+12V).

The negative signal clipper 37 comprises first and second transistors 41, 42 of a second conductivity (NPN) type having their collector electrodes connected together to a source of operating voltage (+12V) and their emitter electrodes connected together and connected via a single emitter load resistor 44 to reference potential.

The base electrodes of each of the first transistors 38, 41 of the clipper circuits are directly connected to the collector of clamp transistor 30 while the base electrodes of each of the second transistors 39, 42 of the clipper circuits are direct coupled to the source of clamp reference voltage across filter capacitor 29.

Figure 3F:

The source of keying pulses 32 is arranged to provide keying pulses during the back porch interval (see FIG. 3F).

In the operation of the luminance signal-sync separator circuit of FIG. 2, the direct voltage level at the collector of clamp transistor 30 is set during each back porch interval at the reference voltage across filter capacitor 29. That is, the positive-going back porch keying pulse (FIG. 3F) switches clamp transistor 30 on, causing luminance signal coupling capacitor 20 to discharge to the level of the reference voltage across filter capacitor 29. When transistor 30 is switched off at the end of the back porch interval, charging resistor 35 serves to supply a relatively low valued charging current to coupling capacitor 20. The average effect of the charging and discharging of capacitor 20 is to maintain the d-c level in the desired fixed relationship to the reference voltage. The charging of capacitor 20 also assures that when clamp transistor 30 is turned on, its collector-base junction is reverse-based and therefore transistor 30 operates in a normal mode. The time constant of resistor 35 and coupling capacitor 20 should be relatively long compared to the clamp pulse period so as to restrict any "tilt" on the coupled signal to an acceptably low value.

The level of the keying pulse input must be greater than the sum of the reference voltage across capacitor 29 plus one $V_{be}$ (0.7 volts) in order to forward bias the base — emitter of clamp transistor 30. During the non-clamping time interval, the keying pulse input level must be maintained below the reference voltage across capacitor 29 so that the base-emitter of clamp transistor 30 remains reverse-based.

Thus, the composite luminance signal supplied to coupling capacitor 20 is clamped during each back porch interval so that the signal blanking level is d-c restored to substantially equal the clamp reference voltage established across filter capacitor 29. The luminance signal which has been d-c restored is then applied in parallel to positive clipper circuit 36 and negative clipper circuit 37.

As noted above, each of positive clipper 36 and negative clipper 37 uses the same reference voltage as the clamping circuit 24 such that the positive clipper circuit 36 will pass all signal levels below the clamp reference voltage (i.e. below signal blanking level), thereby passing only the sync tips, while the negative clipper circuit 37 will pass all signal levels above the signal blanking level; i.e. the luminance signal components.

Figure 4A:
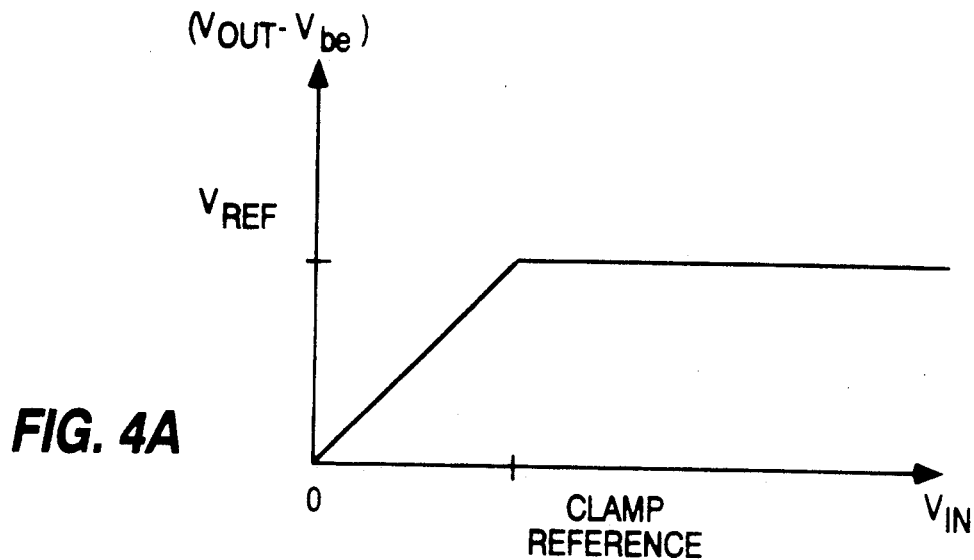
FIGS. 4A–4B illustrate typical transfer characteristics of the clipper circuits of FIG. 2.
Figure 4B:
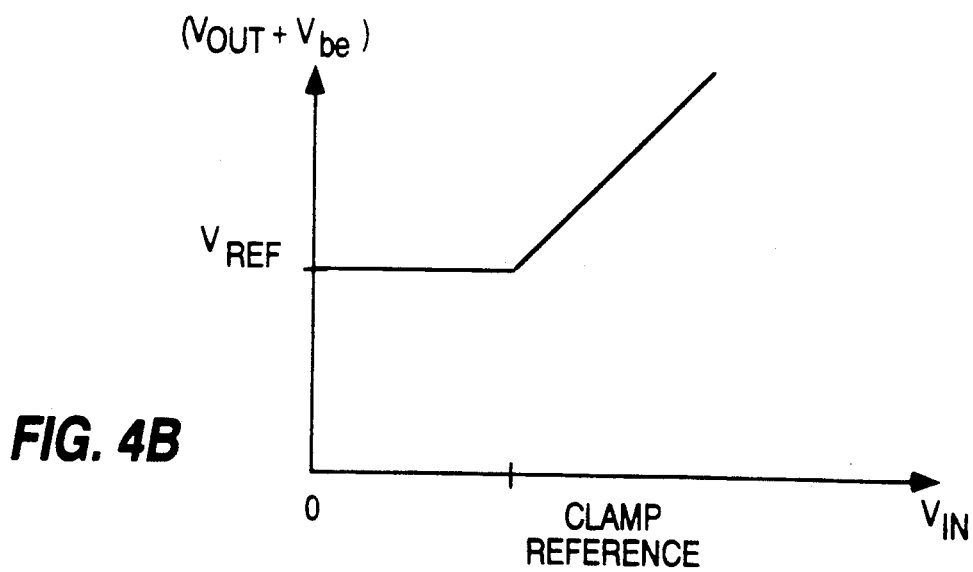

FIGS. 4A and 4B illustrate the transfer functions of the clipper circuits which result in the foregoing performance.

Each of the positive and negative clippers relies upon the non-linear conduction characteristics of the base-emitter junctions of the included transistors. In each case, an emitter follower transistor 38, 41 has its base-emitter juxtaposed with the corresponding junction of a like conductivity biasing or threshold transistor 39, 42. The bases of the biasing transistors are referred back to the clamped blanking level voltage of the luminance signal.

In the case of positive signal clipper 36, when the clamped luminance signal at the collector of clamp transistor 30 and thus the base voltage of follower transistor 38 is less than the reference blanking level voltage (i.e. during sync intervals), the base-emitter of transistor 38 will be forward biased, the base-emitter of transistor 39 will be reverse-biased and transistor 38 will act as an emitter follower to pass the sync signal. The sync signal produced across resistor 40 will follow the incoming sync signal but will be offset by the base-emitter voltage of follower transistor 38. When the luminance signal is greater than the reference voltage, the base-emitter of transistor 38 will be reverse-biased and the reference voltage plus one $V_{be}$ will appear across resistor 40. When the input signal and reference voltage are equal, each of the transistors 38, 39 conducts to provide the reference voltage plus $V_{be}$ at the output. In each case, the output signal is developed across resistor 40 from a low impedance source which is one $V_{be}$ above the lower of the reference voltage and the composite luminance signal at the collector of transistor 30.

The negative signal clipper 37 operates in a similar manner except that the transistors 41, 42 are opposite in conductivity to transistors 38, 39. Therefore, when the applied luminance signal is below the reference voltage, the NPN follower transistor 41 will be reverse biased (during sync tips) and when the applied luminance signal is above the reference voltage, the NPN follower transistor 41 will be forward biased, thereby passing the luminance signal. The resulting luminance signal output devoid of sync signals is derived across emitter load resistor 44 and is one $V_{be}$ below the higher of composite luminance and the clamp reference voltage across capacitor 29.

Use of the circuit of FIG. 2 in the system of FIG. 1 provides the desired result of a luminance signal from which sync has been stripped, thereby facilitating subsequent clamping of both the luminance signal and accompanying demodulated color difference signals (R-Y, G-Y, B-Y) in a matrix circuit 18 by means of a sync interval clamping pulse (FIG. 3E) which is applied separately to the keyed clamp circuit 46 associated with each of the signals R-Y, G-Y, B-Y and Y. The d-c level at the output side of each of coupling capacitors 12, 13, 14 and 23 is thereby properly set during the signal-free sync interval of each of the foregoing signals. This arrangement is preferred over attempting to remove the demodulated burst offset from the color difference signals because the offset is in the middle of the amplitude of the associated signal and may not be removed by amplitude discriminators (such as clippers).

While the invention has been described in term of a preferred embodiment, obvious modifications may occur to persons skilled in this art, which modifications are intended to be covered by the following claims.

What is claimed is:

1. In a television signal processing system, apparatus comprising:
   a source of a composite luminance signal including image-representative luminance components separated by regularly recurring synchronizing signal components, each of said synchronizing signal components being followed by a back porch level;
   a source of back porch interval keying pulses occurring during respective ones of the intervals in which said back porch levels occur;
   keyed clamp and signal clipping means coupled to said luminance signal source and responsive to said back porch interval keying pulses for clamping said composite luminance signal to a predetermined direct voltage level, said keyed clamp and signal clipping means further comprising a voltage sensitive signal clipping circuit responsive to said direct voltage level and to said clamped composite luminance signal for removing said synchronizing signal to produce a processed luminance signal from which said synchronizing signal components have been removed;
   a source of a chrominance signal including image-representative chrominance components separated by regularly recurring color burst signal components occurring during respective ones of said intervals in which said back porch levels occur;
   chrominance signal processing means for demodulating a color subcarrier to produce a plurality of color difference signals, each of said color difference signals including image-representative color difference components separated by regularly occurring burst offset signal components corresponding to respective ones of said color burst signal components;
   a source of synchronizing interval keying pulses occurring during respective ones of the intervals in which said synchronizing signal components occur but which excludes said intervals in which said color burst signal components occur; and
   a plurality of keyed clamp means each responsive to said synchronizing signal interval keying pulses and individually responsive separately to ones of said color difference signals and said processed luminance signal for clamping each of said color difference signals and said processed luminance signal to a common voltage reference level.

2. Apparatus according to claim 1 wherein each of said color difference signals, said composite luminance signal and said processed luminance signal is coupled to a respective keyed clamp means by a coupling capacitor.

3. Apparatus according to claim 2 wherein said voltage sensitive signal clipping means of said keyed clamp and signal clipping means comprises voltage follower amplifier means and biasing means for maintaining said follower amplifier means cutoff during the occurrence of said synchronizing signal components of said composite luminance signal and for causing said follower amplifier means to pass said image-representative luminance signal components of said composite luminance signal free said synchronizing signal components.

4. Apparatus according to claim 3 wherein said clamping means and said biasing means of said keyed clamp and signal clipping means associated with said composite luminance signal are referenced to a common direct voltage reference to ensure cutoff of said voltage follower amplifier means during said intervals in which said synchronizing signal components of said composite luminance signal occur.

5. Apparatus according to claim 4 wherein said clipping means comprises an emitter follower transistor and a biasing transistor of like conductivity type, the latter having a base electrode connected to said direct reference voltage supply and an emitter electrode connected to an emitter electrode of said emitter follower transistor.

6. Apparatus according to claim 5 wherein said clamping means of said keyed clamp and signal clipping means associated with said composite luminance signal comprises a clamping transistor having a main conduction path for discharging said associated coupling capacitor during said intervals in which said back porch levels occur and a charging resistor for charging said associated coupling capacitor between said intervals in which said back porch levels occur.

7. Apparatus according to claim 1 further including matrix means for combining said clamped processed luminance signal with ones of said clamped color difference signals to produce color signals.

8. Apparatus according to claim 7 wherein said keyed clamp and signal clipping means associated with said composite luminance signal is included within a first integrated circuit; and said plurality of keyed clamp means associated with said color difference signals and said processed luminance signal is included within a second integrated circuit.

9. Apparatus according to claim 8 wherein said plurality of keyed clamp means and said matrix means are included within said second integrated circuit.

10. In a television signal processing system, apparatus comprising:
   a source of a composite luminance signal including image-representative luminance components separated by regularly occurring synchronizing signal components, each of said synchronizing signal components being followed by a back porch level;
   a source of back porch interval keying pulses occurring during respective ones the intervals in which said back porch levels occur;
   a first integrated circuit including keyed clamp and coupled to said luminance signal source and responsive to said back porch interval keying pulses for clamping said composite luminance signal to a predetermined direct voltage level; and signal clipping means responsive to said direct voltage level and to said clamped composite luminance signal for removing said synchronizing signal components from said composite luminance signal to produce a processed luminance signal from which said synchronizing signal components have been removed;
   a source of a chrominance signal including image-representative chrominance components separated by regularly occurring color burst signal components occurring during respective ones of said intervals in which said back porch levels occur;
   chrominance signal processing means for demodulating a color subcarrier to produce a plurality of color difference signals, each of said color difference signals including image-representative color difference components separated by regularly occurring burst offset signal components corresponding to respective ones of said color burst signal components;

a source of synchronizing interval keying pulses occurring during respective ones of the intervals in which said synchronizing signal components occur but excluding said intervals in which said color burst signal components occur; and a second integrated circuit including a plurality of keyed clamp means each responsive to said synchronizing signal interval keying pulses and individually responsive separately to ones of said color difference signals and said processed luminance signal for clamping each of said color difference signals and said processed luminance signal to a common voltage reference level; and matrix means for combining said clamped processed luminance signal with ones of said clamped color difference signals to produce color signals.

* * * * *